US012746568B2

(12) United States Patent
Palm et al.

(10) Patent No.: US 12,746,568 B2
(45) Date of Patent: Sep. 29, 2026

(54) EDGE-BANDING MACHINE WITH PNEUMATIC ADHESIVE GRANULATE FEED

(71) Applicant: MASCHINENBAU HEBROCK GMBH, Hüllhorst (DE)

(72) Inventors: Frank Palm, Hüllhorst (DE); Alexander Mantler, Hüllhorst (DE); Christian Hermsmeier, Hüllhorst (DE)

(73) Assignee: MASCHINENBAU HEBROCK GMBH, Hüllhorst (DE)

( * ) Notice: Subject to any disclaimer, the term of this patent is extended or adjusted under 35 U.S.C. 154(b) by 145 days.

(21) Appl. No.: 18/703,836

(22) PCT Filed: Oct. 27, 2022

(86) PCT No.: PCT/EP2022/080054
§ 371 (c)(1),
(2) Date: Apr. 23, 2024

(87) PCT Pub. No.: WO2023/073087
PCT Pub. Date: May 4, 2023

(65) Prior Publication Data

US 2025/0001449 A1 Jan. 2, 2025

(30) Foreign Application Priority Data

Oct. 27, 2021 (DE) ..................... 20 2021 105 873.0

(51) Int. Cl.
*B05C 11/10* (2006.01)
*B05C 1/00* (2006.01)
(Continued)

(52) U.S. Cl.
CPC .......... *B05C 11/1042* (2013.01); *B05C 1/006* (2013.01); *B65G 53/06* (2013.01); *B65G 53/24* (2013.01); *B65G 69/0491* (2013.01)

(58) Field of Classification Search
CPC ... B05C 11/1042; B05C 1/006; B05C 5/0204; B65G 53/06; B65G 53/24; B65G 53/40; B65G 69/0491
See application file for complete search history.

(56) References Cited

U.S. PATENT DOCUMENTS 6,095,803 A * 8/2000 Slater .................. B05C 11/1042
222/146.2
9,580,257 B2 * 2/2017 Varga .................. B05C 11/1047
(Continued)

FOREIGN PATENT DOCUMENTS

DE 3109369 9/1982
DE 4214081 11/1992
(Continued)

*Primary Examiner* — Vishal Pancholi
(74) *Attorney, Agent, or Firm* — PRICE HENEVELD LLP

(57) ABSTRACT

A glue pot filling device for an edge banding machine includes a glue pot for melting an adhesive granulate, wherein the glue pot filling device further includes a storage container for holding the adhesive granulate, an adhesive granulate conveying device for pneumatically conveying the adhesive granulate from the storage container into the glue pot of the edge banding machine. The adhesive granulate conveying device includes a conveying line, which has a first end section assigned to the storage container and a second end section assigned to the glue pot, a compressed air supply device assigned to the first end section for feeding compressed air into the conveying line or a negative pressure supply device assigned to the second end section for feeding a negative pressure into the conveying line, and a filling nozzle arranged at the second end section for discharging the adhesive granulate to the glue pot.

23 Claims, 4 Drawing Sheets

(51) Int. Cl.

| | |
|---|---|
| ***B65G 53/06*** | (2006.01) |
| ***B65G 53/24*** | (2006.01) |
| ***B65G 69/04*** | (2006.01) |

(56) References Cited

U.S. PATENT DOCUMENTS

| | | | | | |
|---|---|---|---|---|---|
| 2006/0182887 | A1* | 8/2006 | Miller | B29B 13/022 | 427/256 |
| 2009/0095730 | A1* | 4/2009 | Ganzer | B29B 13/022 | 222/146.2 |
| 2013/0105005 | A1* | 5/2013 | Tix | B05C 11/1042 | 137/334 |
| 2013/0105526 | A1* | 5/2013 | Ross | B29B 13/022 | 222/630 |
| 2013/0112312 | A1* | 5/2013 | Ross | B65B 1/16 | 141/2 |
| 2014/0263450 | A1 | 9/2014 | Ross et al. | | |
| 2015/0083230 | A1* | 3/2015 | Ganzer | B05C 11/1042 | 137/13 |
| 2015/0298899 | A1 | 10/2015 | Ganzer et al. | | |
| 2016/0175877 | A1* | 6/2016 | Clark | B65G 53/28 | 222/146.2 |

FOREIGN PATENT DOCUMENTS

| | | |
|---|---|---|
| DE | 4134824 | 4/1993 |
| DE | 10022140 | 11/2000 |
| DE | 20104697 | 5/2001 |
| DE | 20203827 | 7/2002 |
| DE | 69525762 | 8/2002 |
| DE | 102007046622 | 4/2009 |
| DE | 102015112764 | 2/2016 |
| DE | 202017001025 | 3/2017 |
| DE | 102020107898 | 9/2021 |
| EP | 2386390 | 11/2011 |
| EP | 2607274 | 6/2013 |
| EP | 2656924 | 10/2013 |
| WO | 2015042382 | 3/2015 |
| WO | 2017167322 | 10/2017 |

* cited by examiner

EDGE-BANDING MACHINE WITH PNEUMATIC ADHESIVE GRANULATE FEED

CROSS-REFERENCE TO FOREIGN PRIORITY APPLICATION

The present application claims the benefit under 35 U.S.C. §§ 119(b), 119(e), 120, and/or 365(c) of International Application No. PCT/EP2022/080054 filed Oct. 27, 2022, which claims priority to German Application No. DE 20 20 2021 105 873.0 filed Oct. 27, 2021.

FIELD OF THE INVENTION

The invention relates to a glue pot filling device for an edge banding machine with a glue pot for melting adhesive granulate and an edge banding machine with a glue pot filling device. The present invention further relates to a method for filling a glue pot of an edge banding machine with adhesive granulate.

BACKGROUND OF THE INVENTION

Edge banding machines are machines for applying edge material to the edges of panel-shaped workpieces. Edge material is supplied as strips or rolls. The aim of edge banding is usually to seal a cut workpiece edge, e.g. of chipboard or lightweight panels.

Various connection technologies are known for edge banding machines. Edge banding machines with a gluing system are widespread and use a liquid adhesive that is applied to a workpiece edge or the edging material to be applied to the material edge using an application roller or an application nozzle. Hot-melt adhesive granulate, which is melted in a heated glue pot, is often used as the adhesive. When adhesive is applied using an application roller, the liquefied hot melt adhesive granulate is transported from the glue pot to the application roller via a conveyor system. The application roller picks up the liquid hot melt adhesive and transfers it to the edge of the workpiece or the edge material.

Edge banding machines are available in various models and with different equipment, but can basically be divided into six zones to which different units are assigned. These zones can be referred to as the formatting zone, gluing zone, pressure zone, post-processing, finish, and workpiece return. Depending on the model and equipment of an edge banding machine, zones may also be missing, e.g., the workpiece return.

The individual zones are briefly explained below, assuming an edge banding machine with glue pot and application roller. Various techniques have been proposed in the prior art for applying adhesive in the gluing zone. For example, laser, hot air, or infrared light can be used to melt the adhesive and/or edge material.

In the formatting zone, the workpiece edge is milled straight and tear-free, whereby the workpiece edge can also be profiled. Adhesive is applied to the workpiece edge or the edging material in the gluing zone. In the pressure zone, the workpiece edge and the edge material are brought together and pressed together. The pressure causes the edge band material to adhere to the workpiece edge so strongly that finishing can take place after the pressure zone. During post-processing, protruding edge material is removed from the workpiece edge and the edge material is rounded in the area of the workpiece corners. Finally, during finishing, adhesive residue is removed, milling marks are removed, and the edge material is polished or smoothed. During workpiece return, the workpiece is returned to the infeed side of the edge banding machine once processing is complete.

The color of the adhesive used has a significant influence on the visual result of the joint created between the workpiece edge and edge material during edge banding. Depending on the application, a different adhesive color may therefore be desirable. Changing the adhesive color can lead to longer downtimes of the edge banding machine, especially if the glue pot used cannot be replaced. However, replacing a glue pot with another glue pot can also be time-consuming and labor-intensive. In any case, it is often necessary to completely remove glue residues with the old glue color from the glue system, i.e., the glue pot, the conveyor system and the application roller, before edge banding can be continued with the new glue color. The glue residue is usually disposed of when changing the glue color.

When edge banding, it should also be taken into account that glue that has been in the glue pot for too long can boil and stick to the side walls of the glue pot. To prevent glue from caking on the side walls of the glue pot, agitator systems can be used to continuously mix the liquefied glue in the glue pot.

Various adhesive systems for adhesive granulate are known from the state of the art. The general aim is to keep the amount of melted adhesive granulate low in order to prevent physical changes to the melted adhesive granulate as a result of prolonged exposure to heat. White glue, for example, has the property of caramelizing and taking on a beige color after prolonged exposure to heat.

The state of the art suggests, for example, filling adhesive granulate from a storage container into a heatable premelting container, in which the adhesive granulate is melted with a small amount of heat until it liquefies and can be transferred in comparatively small quantities to a smaller, heatable glue pot. In the glue pot, the adhesive granulate is brought to its final temperature and finally reaches the application roller via a conveyor system. A corresponding glue system is described, for example, in DE 202 03 827 U1 and DE 201 04 697 U2.

However, a simple and convenient glue pot filling device is not known from the state of the art.

SUMMARY OF THE INVENTION

Against this background, it is a task of the invention to provide a structurally simple and easy-to-operate glue pot filling device for a glue pot of an edge banding machine.

This task is solved according to the claims by a glue pot filling device for an edge banding machine with a glue pot for melting adhesive granulate. The glue pot filling device according to the invention allows only as much adhesive granulate to be fed to the glue pot as is required for a processing operation. The glue pot filling device comprises a storage container for holding adhesive granulate and an adhesive granulate conveying device for pneumatically conveying the adhesive granulate from the storage container into the glue pot of the edge banding machine. The adhesive granulate conveying device comprises a conveying line which has a first end section assigned to the storage container and a second end section assigned to the glue pot. Furthermore, the adhesive granulate conveying device comprises a compressed air supply device assigned to the first end section for feeding compressed air into the conveying line or a negative pressure supply device assigned to the second end section for feeding a negative pressure into the conveying line. A conveying air flow builds up in the conveying pipe and in the filling nozzle due to the use of compressed air or negative pressure. The adhesive granulate conveying device also includes a filling nozzle arranged at the second end section for discharging the adhesive granulate to the glue pot. The glue pot has a heating device for melting the adhesive granulate. The storage container, on the other hand, has no heating device, so that the adhesive granulate is present in the storage container in its unmelted form.

According to the invention, the conveying takes place by means of an air flow which is generated either by an overpressure applied on the inlet side or by means of a negative pressure applied on the outlet side. On the one hand, this means that at the beginning of the conveying process, air is fed into the conveying line at an overpressure relative to an ambient pressure and, in the region of the end of the conveying line, this compressed air under overpressure relaxes against an ambient pressure, whereby the air flow required for conveying is achieved. Alternatively, this means that a negative pressure is generated in the region of the outlet opening, i.e., air is sucked out of the conveying line, and the air flow is generated by this negative pressure in relation to an ambient pressure at the beginning of the conveying line. According to the invention, both measures—i.e., generation of negative pressure in the area of the outlet opening and generation of positive pressure in the area of the inlet opening—can also be combined with one another.

The compressed air supply device can include a compressor. Alternatively, the compressed air supply device can also be connected only to a compressed air source, such as a compressor, or a compressed air network. The air pressure of the compressed air fed into the conveying line by the compressed air supply device can be between 1 bar and 5 bar.

As the generation of compressed air is energy-intensive and therefore expensive, it is advantageous to reduce the amount of compressed air required for conveying the adhesive granulate as much as possible. For this reason, a volume booster is assigned to the first end section of the conveying line according to a preferred embodiment. In particular, the volume booster can be arranged in the first end section of the conveying line at a compressed air feed point. Since the air flow generated by a volume booster in conjunction with a compressed air supply device consists of the compressed air supplied by the compressed air supply device and ambient air drawn in from the surroundings, a volume booster reduces the amount of compressed air required for pneumatic adhesive granulate conveying relative to a glue pot filling device without a volume booster. If large conveying distances are to be bridged, several volume flow boosters can also be arranged at a distance from each other along the conveying line. The same naturally also applies when using a vacuum supply device.

The conveying line, which can be a hose or a pipe, and the filling nozzle define a conveying direction for the adhesive granulate-compressed air mixture along their longitudinal axis. Preferably, the geometry of the filling nozzle causes a change in direction of the adhesive granulate-compressed air mixture from a first conveying direction to a second conveying direction. The first conveying direction is therefore different from the second conveying direction. According to a preferred embodiment, the filling nozzle has a wall with at least one air escape opening. The at least one air escape opening of the filling nozzle is arranged such that the compressed air (or the conveying air flow) escapes from the filling nozzle along the first conveying direction, i.e., is not subjected to the change in direction, and the adhesive granulate emerges from the filling nozzle along the second conveying direction. For example, the at least one air escape opening can be arranged in a region on the outside of the curve of the filling nozzle. In this way, it is possible to prevent the compressed air guided in the conveying line from hitting the molten adhesive granulate in the glue pot and cooling it down as it escapes from the filling nozzle.

The size of the at least one air escape opening is dimensioned in such a way that no adhesive granulate escapes from the filling nozzle together with the compressed air. Accordingly, the smallest diameter of the at least one air escape opening can be smaller than the smallest expected adhesive granulate diameter of the adhesive granulate used. Additionally or alternatively, a sieve or filter device can be located upstream or downstream of the at least one air escape opening. The at least one air escape opening can have the form of one or more slots, the width of which is smaller than the smallest dimension of the adhesive granulate, although other designs are of course also possible.

By providing the at least one air escape opening in the area of the end of the filling nozzle facing the glue pot, an adhesive granulate jam in the filling nozzle can be avoided and/or the pressure of the compressed air fed into the conveying line by the compressed air supply device required for reliable adhesive granulate conveying can be kept comparatively low. Accordingly, it is advantageous if the second conveying direction has a component in the direction of gravity, so that the effect of gravity supports or even mainly or solely effects the discharge of the adhesive granulate from the filling nozzle in this conveying section. In principle, it should be understood that the second conveying direction should be closer to the direction of gravity than the first conveying direction. The first conveying direction can preferably have a component opposite or perpendicular to the direction of gravity in order to ensure that no compressed air flows into the glue pot and onto the granulate melt.

According to a preferred embodiment, the filling nozzle has an inverted U-shape with a first and second leg and a connecting piece joining the two legs. The first leg is connected to the conveying line. The at least one air escape opening can be provided in the area of the connecting piece and/or the second leg. In particular, it is preferred if the at least one air escape opening is arranged in a first sloping and/or in a second sloping section of the filling nozzle. The first and second legs can be straight or curved. In some embodiments, a connecting piece between the first and second legs can be dispensed with.

According to a further preferred embodiment, it is provided that the filling nozzle has a first section through which the compressed air is directed along a first direction, and a second section adjoining the first section through which the compressed air is directed along a second direction different from the first direction. The at least one air escape opening can be arranged in a transition region between the first and second sections. The compressed air can flow out of the filling nozzle along a third direction, which is different from the second direction. The third direction may coincide with the first direction or be different from the first direction.

Particularly in the event that the adhesive granulate is separated from the compressed air at the filling nozzle, it is advantageous to provide an air baffle plate at the filling nozzle, which serves to cool the end of the filling nozzle facing the glue pot with compressed air. A further compressed air supply device can be provided to supply the air baffle with compressed air.

According to a further preferred embodiment, the adhesive granulate conveying device further comprises a suction pipe arranged at the first end section of the conveying line. The suction pipe can be provided in one piece with the conveying line or separately from the conveying line. By providing a pipe jacket of the suction pipe with at least one through-opening, it is possible to prevent a build-up of adhesive granulate in the suction pipe when adhesive granulate is sucked out of the storage container. As with the at least one air vent opening of the filling nozzle, the at least one passage opening should not be larger than the smallest expected adhesive granulate diameter. Additionally or alternatively, the geometric design of the intake tube can counteract a build-up of adhesive granulate in the intake tube.

The storage container can be designed in different ways. For example, the storage container can have a wall with an adhesive granulate inlet opening for filling adhesive granulate into the storage container and an adhesive granulate outlet opening. In this case, the suction pipe is connected to the storage container in such a way that the suction pipe sucks the adhesive granulate through the adhesive granulate outlet opening. The adhesive granulate outlet opening is preferably located at the bottom of the storage container. The suction tube and the storage container can be formed in one piece. Preferably, the storage container is funnel-shaped and the adhesive granulate outlet opening is provided at the tapered end of the storage container, whereby unwanted residues of adhesive granulate in the storage container, which can form despite the suction effect generated in the suction pipe by the compressed air supply device, can be avoided.

If the storage container has only one adhesive granulate inlet opening, i.e., if there is no adhesive granulate outlet opening provided in the wall of the storage container in addition to the adhesive granulate inlet opening or if the adhesive granulate outlet opening is closed, the conveying line can extend through the adhesive granulate inlet opening and into the adhesive granulate so that the first end section of the conveying line can suck in the adhesive granulate in the storage container when the compressed air supply device is in operation. This is particularly advantageous if the storage container is a bag or the like.

According to a preferred embodiment, a fill level measuring device is assigned to the storage container in order to ensure that there is sufficient adhesive granulate in the storage container for a processing operation. Additionally or alternatively, a fill level monitoring device can be assigned to the glue pot.

It is preferable if the filling nozzle is arranged on the second end section of the conveying line so that it can swivel about a swivel axis. In particular, the filling nozzle can be pivoted between a working position for filling the glue pot and a stowed position. The stowed position of the filling nozzle can be advantageous, for example, when replacing the glue pot. The swivel axis can run vertically.

If different adhesive granulates are required for a processing operation or successive processing operations, it is desirable if a change from one adhesive granulate to another adhesive granulate can be accomplished as easily as possible. In this case, the glue pot filling device has a first storage container for holding a first adhesive granulate and a second storage container for holding a second adhesive granulate.

According to a first embodiment, the adhesive granulate conveying device can be switched between pneumatic conveying of the first adhesive granulate from the first storage container and pneumatic conveying of the second adhesive granulate from the second storage container. For example, the conveying line can initially be connected to the first storage container and then disconnected from the first storage container and connected to the second storage container. During the switchover process, the compressed air supply device can be deactivated.

According to a second embodiment, the present invention proposes for a simplified adhesive granulate change to assign a first adhesive granulate conveying device to the first storage container and a second adhesive granulate conveying device to the second storage container. The first adhesive granulate conveying device is different from the second adhesive granulate conveying device. The two adhesive granulate conveying devices are constructed as described above, i.e., they each comprise a conveying line, a compressed air supply device, and a filling nozzle. The two compressed air supply devices can be fed from the same compressed air source or connected to the same compressed air network. By switching between operation of the first adhesive granulate conveying device and operation of the second adhesive granulate conveying device, the first or second adhesive granulate is accordingly filled into the glue pot of the edge banding machine.

To facilitate a change of adhesive granulate, the present invention proposes, according to a third embodiment, that the adhesive granulate conveying device of a glue pot filling device comprises, in addition to a compressed air supply device and a filling nozzle, a first and second conveying line, each of which has a first and second end section. The first end section of the first conveying line is assigned to the first storage container and the first end section of the second conveying line is assigned to the second storage container. The filling nozzle of the adhesive granulate conveying device is arranged at the second end section of the first and second conveying lines and can therefore be fed with adhesive granulate through both conveying lines.

In all three embodiments, the first or second adhesive granulate can also be a cleaning granulate for cleaning and rinsing the glue pot.

The present invention also relates to an edge banding machine with a glue pot for melting adhesive granulate and a glue pot filling device described above. Preferably, the edge banding machine comprises a control unit. The control unit can be the central control of the edge banding machine. If an edge banding machine is retrofitted with a compressed air supply device according to the invention, the compressed air supply device can be supplied with a corresponding update for the control unit of the edge banding machine or the corresponding update can be made available to the edge banding machine in another way, e.g., via a link.

However, the compressed air supply device according to the invention can also be equipped with its own control unit, which can interact with a control unit of the edge banding machine or be independent of such a unit.

The control unit can be connected to the compressed air supply device and, if present, also to the level measuring device of the storage container and the level monitoring device of the glue pot. The control unit can be set up to automatically control operation of the compressed air supply device by means of the level measuring device assigned to the storage container and/or the level monitoring device assigned to the glue pot. If, for example, the level of adhesive granulate in the glue pot falls below a predetermined minimum level when the compressed air supply device is deactivated, the control unit can activate the compressed air supply device so that the level in the glue pot rises above the minimum level again. However, if the fill level of adhesive granulate in the glue pot rises above a maximum fill level, the control unit can deactivate the compressed air supply device so that the fill level in the glue pot does not rise any further. This ensures that the fill level in the glue pot is always between the minimum fill level and the maximum fill level. The minimum and/or maximum fill level can preferably be set by an operator via an input device of the control unit or stored in a memory unit of the control unit, depending on the operating procedure. The control unit can also be set up to emit a corresponding message, for example in the form of a warning signal, to an operator of the edge banding machine or glue pot filling device if the fill level in the storage container falls below a predetermined minimum fill limit.

The control unit can additionally or alternatively be set up to carry out a change of adhesive granulate in response to a corresponding command from an operator of the edge banding machine. For this purpose, in the case of an edge banding machine with a glue pot filling device according to the first embodiment described above, the control unit can be set up to switch between operation of the first glue pellet conveying device and operation of the second glue pellet conveying device in order to convey either the first glue pellet or the second glue pellet into the glue pot. However, it is also possible to operate both adhesive granulate conveying devices so that both the first adhesive granulate and the second adhesive granulate are filled into the glue pot.

In an edge banding machine with a glue pot filling device according to the second embodiment described above, the control unit can be set up to switch between the adhesive granulate conveying with the first conveying line and the second conveying line in order to convey either the first adhesive granulate or the second adhesive granulate into the glue pot. It is also conceivable to convey the adhesive granulate through both conveying lines so that the glue pot is filled with both adhesive granulates.

The present invention also relates to a method for filling a glue pot of an edge banding machine with adhesive granulate. The method comprises the step of pneumatically conveying adhesive granulate from a storage container along a conveying line into the glue pot. Compressed air is preferably used for the pneumatic conveying of adhesive granulate.

If a glue pot filling device as described above is used, the method comprises the following steps in a preferred embodiment:

- Conveying the adhesive granulate by means of compressed air from the storage container through the conveying line to a granulate inlet opening of the filling nozzle;
- Conveying the adhesive granulate by means of compressed air through a first section of the filling nozzle along a first direction;
- Conveying the adhesive granulate by gravity through a second section of the filling nozzle, which adjoins the first section, to a granulate outlet opening of the filling nozzle, in a second direction which is different from the first direction and has a component in the direction of gravity;
- Conveying at least part of the compressed air from at least one air escape opening, which is arranged in the transition region between the first section and the second section of the filling nozzle in a wall of the filling nozzle, in a third direction, which is different from the second direction.

The third direction can essentially coincide with the first direction.

Preferably, the second direction is directed into the glue pot and the third direction is not directed into the glue pot. The third direction preferably has a component opposite to the direction of gravity in order to direct the compressed air upwards and away from the glue pot. The third direction may coincide with the first direction.

The method may include the following steps:

- Continuous determination of a filling level of adhesive granulate in the glue pot by means of the filling level monitoring device assigned to the glue pot, and
- Automatic activation of the deactivated compressed air supply device by means of the control unit of the edge banding machine if the determined fill level in the glue pot is lower than a predetermined minimum fill level assigned to the glue pot.

The compressed air supply device can remain activated for a predetermined time interval. In this way, new adhesive granulate can be fed into the glue pot in portions. In addition or alternatively, the activated compressed air supply device can be automatically deactivated by the control unit of the edge banding machine if the determined fill level in the glue pot is greater than a predetermined maximum fill level assigned to the glue pot.

The method according to the invention may additionally or alternatively comprise the following steps:

- Determining a filling level of adhesive granulate in the storage container by means of the filling level measuring device assigned to the storage container, and
- Output of a warning signal if the determined fill level in the storage container is lower than a predetermined minimum fill limit assigned to the storage container.

Although the above explanations assume the use of a compressed air supply device, the same applies if a vacuum supply device is used to convey the adhesive granulate instead of the compressed air supply device or in addition to the compressed air supply device.

BRIEF DESCRIPTION OF THE DRAWINGS

The invention is described in detail below by means of an embodiment example. It shows.

DETAILED DESCRIPTION OF THE EMBODIMENTS

Figure 1:
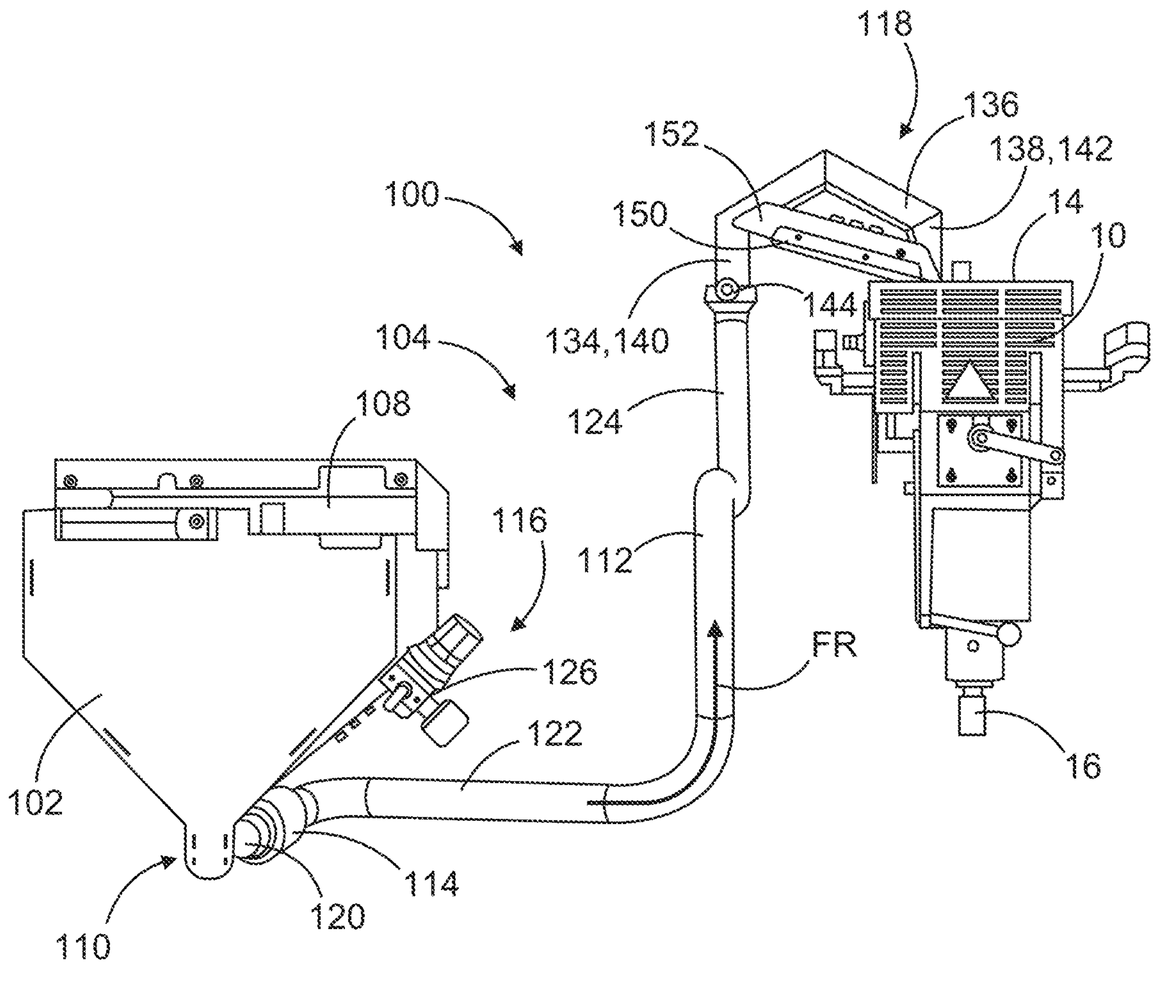
FIG. 1 is a general plan view of a glue pot filling device for a glue pot of an edge banding machine.
Figure 2:
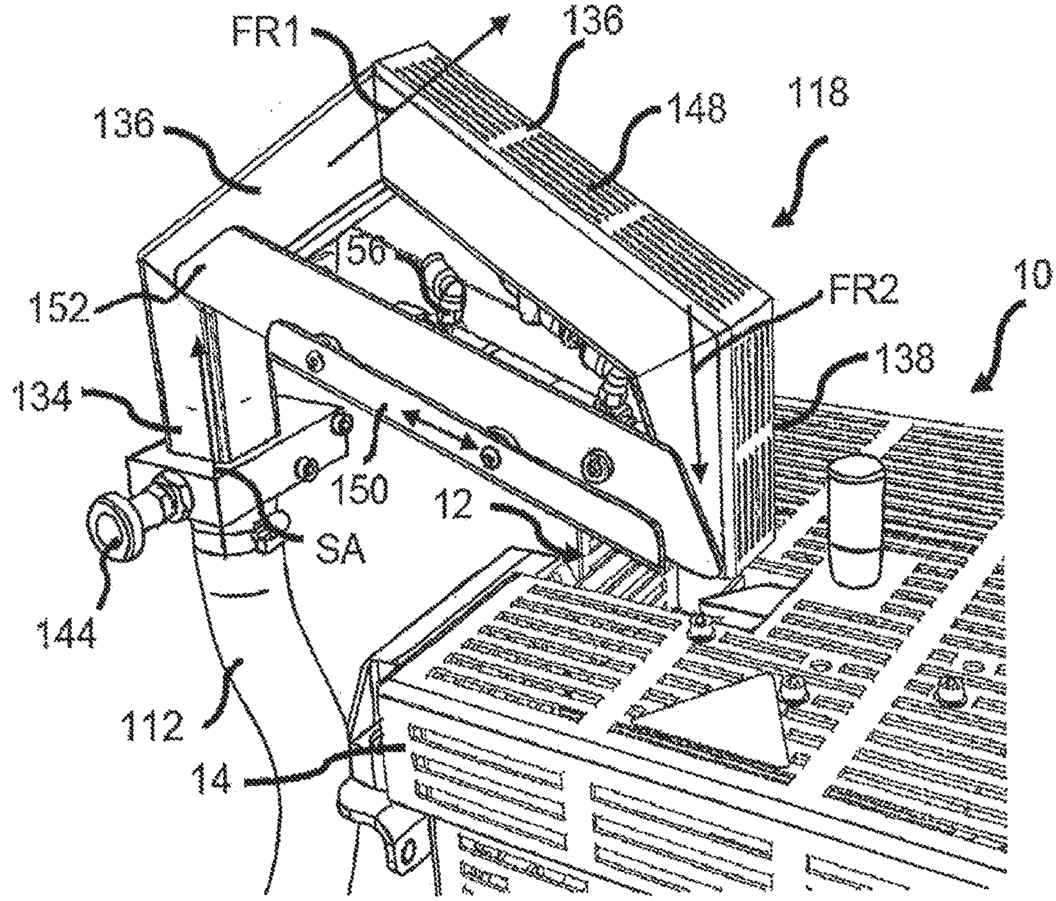
FIG. 2 is a detailed perspective view of the filling nozzle of the glue pot filling device of FIG. 1.
Figure 3:
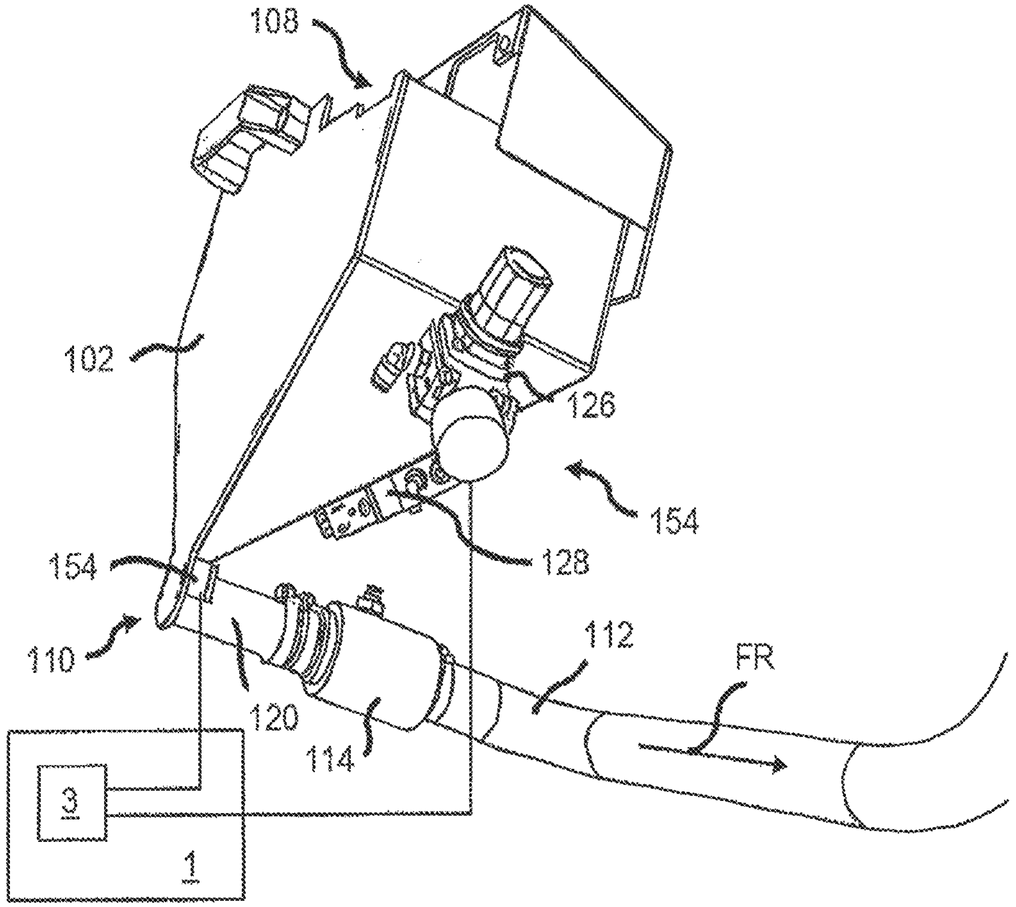
FIG. 3 is a detailed perspective view of the storage container of the glue pot filling device of FIG. 1.

FIG. 1 shows a side view of a glue pot filling device 100 according to the invention for a glue pot 10 of an edge banding machine 1 (schematically indicated in FIG. 3). The glue pot 10 has a filling opening 12 (indicated in FIG. 2) for adhesive granulate, which can be closed by a glue pot lid 14, and a heating device, not shown, for melting the adhesive granulate. The glue pot 10 is preferably made of metal. An application roller 16 for applying the liquefied adhesive granulate in the glue pot 10 to a narrow edge of a panel-shaped workpiece or an edge material to be glued to the narrow edge is assigned to the glue pot 10. Adhesive granulates are available with different chemical and physical properties, such as different colors. In particular, the adhesive granulate can be a hot-melt adhesive granulate, e.g., an EVA or PUR adhesive. The glue pot 10 is preferably provided interchangeably in or on the edge banding machine 1, for example in order to be able to easily change the color of the adhesive granulate. The glue pot 10 can also be a heatable pre-melting container or another container set up for melting adhesive granulate.

The glue pot filling device 100 comprises a funnel-shaped storage container 102 and an adhesive granulate conveying device 104. The storage container 102 has a wall defining an adhesive granulate inlet opening 108 and an adhesive granulate outlet opening 110.

The adhesive granulate conveying device 104 comprises a conveying line 112, a volume flow booster 114, a compressed air supply device 116, a filling nozzle 118, and a suction pipe 120. The conveying line 112 can be a hose or a pipe. The conveying line 112 has a first end section 122 and a second end section 124. The first end section 122 of the conveying line 112 is connected to the intake pipe 120 via the volume flow booster 114. The intake pipe 120 is attached to the storage container 102 at a lower end of the storage container 102. The filling nozzle 118 has a feed end section 140 and a discharge end section 142. The feed end section 140 of the filling nozzle 118 is arranged at the second end section 124 of the conveying line 112. The discharge end section 142 of the filling nozzle 118 tapers towards the discharge end of the filling nozzle 118.

The suction pipe 120, the volume flow booster 114, the conveying line 112, and the filling nozzle 118 define a conveying direction FR of the adhesive granulate-compressed air mixture at each point of their longitudinal axis.

In the illustrated embodiment example, the compressed air supply device 116 comprises a pressure regulator 126 with pressure switch 128 (FIG. 3) connected to a compressor (not shown), which feeds compressed air into the volume booster 114. It should be noted that not all connecting hoses and the like are shown in the figures for the sake of clarity. By feeding compressed air into the volume booster 114, a suction effect is created in the intake pipe 120, which transports the adhesive granulate located in the storage container 102 together with ambient air through the intake pipe 120 and the volume booster 114 into the conveying line 112.

Instead of detachably attaching the conveying line 112 or the intake tube 120 to the storage container 102 as shown in FIGS. 1 and 3 so that the intake tube 120 communicates with the adhesive granulate outlet opening 110, the conveying line or the intake tube 120 (with the adhesive granulate outlet opening 110 closed) can also be immersed in the adhesive granulate present in the storage container 102.

The suction pipe 120 has a pipe jacket, which can have one or more through openings (not shown in the Figures). The one or more through openings prevent adhesive granulate from accumulating when the adhesive granulate enters the suction tube 120.

The filling nozzle 118 is U-shaped and has a first leg 134 connected to the feed line 112 and a second leg 138 connected to the first leg 134 via an angled connecting piece 136. The first leg 134 forms the feed end section 140 of the filling nozzle 118 and the second leg 138 forms the discharge end section 142 of the filling nozzle 118. However, the filling nozzle 118 can also have a different shape, for example, with a round bent connecting piece 136 instead of an angled one. Furthermore, it is also possible to form the filling nozzle 118 in one piece with the conveying line 112.

The filling nozzle 118 can be swiveled about a swivel axis SA (vertical in the Figures) from a working position shown in the figures to a stowed position (not shown in the Figures) by means of a swivel mechanism 144. The pivot axis SA extends along a longitudinal axis of the first leg 134. In the working position, the discharge end section 142 of the filling nozzle 118 is located above the filling opening 12 of the glue pot 10.

As can be seen in FIG. 2, the filling nozzle 118 has a plurality of air escape openings 148 in its wall. In the embodiment example shown, the air escape openings 148 are formed as air slots extending along a longitudinal direction of the filling nozzle 118. The air escape openings 148 are provided in a region of the conversion that comprises the second leg 138 and a section of the connecting piece 136 that is closer to the second leg 138. More specifically, the air escape openings 148 are disposed along an outer peripheral surface of the U-shaped filling nozzle 118 so that the compressed air exiting the air escape openings 148 flows upwardly. The outflow direction (or at least one component thereof) is indicated by the arrow FR1 in FIG. 2. The adhesive granulate emerges from the filling nozzle 118 in the direction of the arrow FR2, which is essentially vertical, i.e., in the direction of gravity. This design of the filling nozzle 118 prevents the compressed air from hitting the molten adhesive granulate in the glue pot 10 and cooling it down.

Figure 4:
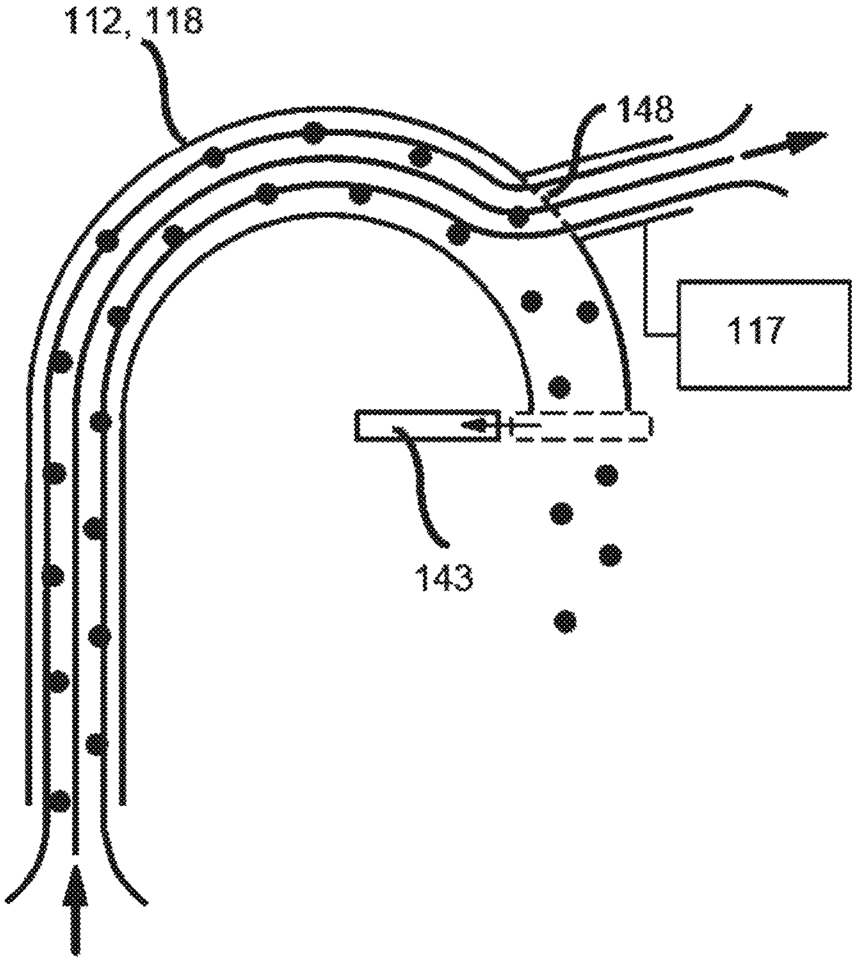
FIG. 4 is a schematic representation of a conveying pipe in which the adhesive granulate is conveyed with the aid of negative pressure.

In a variant of this embodiment example shown schematically in FIG. 4, air could also be sucked out of the filling nozzle 118 through the air escape openings 148, thereby generating a negative pressure in the region of the discharge end section 142 in the filling nozzle 118, which leads to an air flow through the conveying line 112. This can be carried out with an ambient pressure or an overpressure at the start of the conveying line. FIG. 4 shows a closure element 143 provided for closing the outlet opening of the filling nozzle 118, which helps to ensure that the correct pressure conditions are built up in the delivery pipe 112 and filling nozzle 118, particularly in the start-up phase of conveying operation. During actual conveying operation, the closure element 143 releases the outlet opening. The position of the closure element 143 can be set manually, mechanically, or electronically.

In the case shown, the cross section of the filling nozzle 118 is rectangular in the region of the first leg 134 and the connecting piece 136 and diamond-shaped in the region of the second leg 138. Of course, other cross-sectional shapes can also be used. For example, the filling nozzle 118 can have a round cross section.

An air baffle 150 is provided on the filling nozzle 118, which is movably arranged in a guide rail 152 along the guide rail 152 and which can be supplied with compressed air from a further compressed air supply device 156 in order to cool the discharge end section 142 of the filling nozzle 118.

As can be seen in FIG. 3, a level measuring device 154 is arranged in the area of the adhesive granulate outlet opening 110 of the storage container 102. A fill level monitoring device (not shown) can also be assigned to the glue pot 10. These can each be designed as a fill level sensor, for example by using a distance measurement to detect the level in the storage container 102 or in the glue pot 10. The edge banding machine 1 preferably has a control unit 3, which is connected to the compressed air supply device 116 (and/or the vacuum supply device 117) as well as to the level measuring device 154 of the storage container and the level monitoring device of the glue pot 10 in a signal-transmitting manner. The signal transmission is only indicated schematically in FIG. 3 and can take place wirelessly or via electrical lines.

The invention claimed is:

1. A glue pot filling device for an edge banding machine having a glue pot for melting an adhesive granulate, the glue pot filling device comprising:

a storage container for holding an adhesive granulate; and an adhesive granulate conveying device for pneumatically conveying the adhesive granulate from the storage container into the glue pot of the edge banding machine wherein the adhesive granulate conveying device comprises:

a conveying line having a first end section assigned to the storage container and a second end section assigned to the glue pot;

a compressed air supply device assigned to the first end section for feeding compressed air into the conveying line or a negative pressure supply device assigned to the second end section for feeding a negative pressure into the conveying line; and a filling nozzle arranged at the second end section for discharging the adhesive granulate to the glue pot;

wherein the filling nozzle defines at least a first conveying direction and a second conveying direction different from the first conveying direction and the filling nozzle further comprises a conversion with at least one air escape opening, wherein the at least one air escape opening is arranged such that the compressed air escapes from the filling nozzle along the first conveying direction and the adhesive granulate emerges from an end of the filling nozzle facing the glue pot along the second conveying direction.

2. The glue pot filling device according to claim 1, wherein the adhesive granulate conveying device further comprises a volume flow booster associated with the first end section of the conveying line.

3. The glue pot filling device according to claim 1, wherein the first conveying direction points away from the glue pot.

4. The glue pot filling device according to claim 1, wherein the adhesive granule conveying device further comprises a suction pipe arranged at the first end section of the conveying line.

5. The glue pot filling device according to claim 4, wherein the suction pipe has a pipe casing with at least one through-opening.

6. The glue pot filling device according to claim 4, wherein the storage container has a wall with an adhesive granulate inlet opening for filling the adhesive granulate into the storage container and an adhesive granulate outlet opening, and the suction pipe is connected to the storage container such that the suction pipe sucks in the adhesive granulate through the adhesive granulate outlet opening.

7. The glue pot filling device according to claim 1, wherein the storage container comprises a wall with an adhesive granulate inlet opening and the conveying line extends through the adhesive granulate inlet opening.

8. The glue pot filling device according to claim 1, further comprising a filling level measuring device associated with the storage container.

9. The glue pot filling device according to claim 1, further comprising a filling level monitoring device associated with the glue pot.

10. A glue pot filling device for an edge banding machine having a glue pot for melting an adhesive granulate, the glue pot filling device comprising:

a storage container for holding an adhesive granulate; and an adhesive granulate conveying device for pneumatically conveying the adhesive granulate from the storage container into the glue pot of the edge banding machine wherein the adhesive granulate conveying device comprises:

a conveying line having a first end section assigned to the storage container and a second end section assigned to the glue pot;

a compressed air supply device assigned to the first end section for feeding compressed air into the conveying line or a negative pressure supply device assigned to the second end section for feeding a negative pressure into the conveying line;

a filling nozzle arranged at the second end section for discharging the adhesive granulate to the glue pot; and an air baffle for cooling an end of the filling nozzle facing the glue pot.

11. A glue pot filling device for an edge banding machine having a glue pot for melting an adhesive granulate, the glue pot filling device comprising:

a storage container for holding an adhesive granulate; and an adhesive granulate conveying device for pneumatically conveying the adhesive granulate from the storage container into the glue pot of the edge banding machine wherein the adhesive granulate conveying device comprises:

a conveying line having a first end section assigned to the storage container and a second end section assigned to the glue pot;

a compressed air supply device assigned to the first end section for feeding compressed air into the conveying line or a negative pressure supply device assigned to the second end section for feeding a negative pressure into the conveying line; and a filling nozzle arranged at the second end section for discharging the adhesive granulate to the glue pot;

wherein:

the filling nozzle is arranged pivotably about a pivot axis on the second end section of the conveying line; or the filling nozzle comprises a first and a second nozzle section, the second nozzle section being pivotable relative to the first nozzle section.

12. A glue pot filling device for an edge banding machine having a glue pot for melting an adhesive granulate, the glue pot filling device comprising:

a storage container for holding an adhesive granulate; and an adhesive granulate conveying device for pneumatically conveying the adhesive granulate from the storage container into the glue pot of the edge banding machine wherein the adhesive granulate conveying device comprises:

a conveying line having a first end section assigned to the storage container and a second end section assigned to the glue pot;

a compressed air supply device assigned to the first end section for feeding compressed air into the conveying line or a negative pressure supply device assigned to the second end section for feeding a negative pressure into the conveying line; and a filling nozzle arranged at the second end section for discharging the adhesive granulate to the glue pot;

wherein the storage container is a first storage container for receiving a first adhesive granulate and the glue pot filling device further comprises a second storage container for receiving a second adhesive granulate, wherein the adhesive granulate conveying device is switchable between pneumatic conveying from the first storage container and from the second storage container.

13. The glue pot filling device according to claim 12, wherein the storage container is a first storage container for receiving a first adhesive granulate and the glue pot filling device further comprises a second storage container for receiving a second adhesive granulate, wherein a first adhesive granulate conveying device is associated with the first storage container and a second adhesive granulate conveying device is associated with the second storage container.

14. The glue pot filling device according to claim 12, wherein:

the storage container is a first storage container for receiving a first adhesive granulate and the glue pot filling device further comprises a second storage container for receiving a second adhesive granulate;

the conveying line is a first conveying line and the adhesive granulate conveying device further comprises a second conveying line with a first end section and a second end section; and the first end section of the first conveying line is associated with the first storage container, the first end section of the second conveying line is associated with the second storage container, and the filling nozzle is arranged at the second end section of the first and second conveying lines.

15. An edge banding machine with a glue pot for melting an adhesive granulate and a glue pot filling device, the glue pot filling device comprising:

a storage container for holding an adhesive granulate; and an adhesive granulate conveying device for pneumatically conveying the adhesive granulate from the storage container into the glue pot of the edge banding machine wherein the adhesive granulate conveying device comprises:

a conveying line having a first end section assigned to the storage container and a second end section assigned to the glue pot;

a compressed air supply device assigned to the first end section for feeding compressed air into the conveying line or a negative pressure supply device assigned to the second end section for feeding a negative pressure into the conveying line; and a filling nozzle arranged at the second end section for discharging the adhesive granulate to the glue pot;

wherein:

the storage container is a first storage container for receiving a first adhesive granulate and the glue pot filling device further comprises a second storage container for receiving a second adhesive granulate;

a first adhesive granulate conveying device is associated with the first storage container and a second adhesive granulate conveying device is associated with the second storage container; and further comprising a control unit adapted to switch between an operation of the first adhesive granulate conveying means and the second adhesive granulate conveying means to convey the first adhesive granulate or the second adhesive granulate into the glue pot.

16. The edge banding machine according to claim 15, further comprising a filling level measuring device associated with the storage container and a control unit adapted to automatically control an operation of the compressed air supply device or the vacuum supply device by means of the level measuring device associated with the storage container.

17. The edge banding machine according to claim 15, further comprising a filling level monitoring device associated with the glue pot and a control unit adapted to automatically control an operation of the compressed air supply device or the negative pressure supply device by means of the level monitoring device associated with the glue pot.

18. The edge banding machine according to claim 15, wherein:

the storage container is a first storage container for receiving a first adhesive granulate and the glue pot filling device further comprises a second storage container for receiving a second adhesive granulate;

the conveying line is a first conveying line and the adhesive granulate conveying device further comprises a second conveying line with a first end section and a second end section;

the first end section of the first conveying line is associated with the first storage container and the first end section of the second conveying line is associated with the second storage container and the filling nozzle is arranged at the second end section of the first and second conveying lines; and further comprising a control unit adapted to switch between conveying with the first conveying line and the second conveying line to convey the first adhesive granulate or the second adhesive granulate into the glue pot.

19. A method of filling a glue pot of an edge banding machine with an adhesive granulate, the method comprising pneumatically conveying the adhesive granulate from a storage container along a conveying line into the glue pot;

wherein the glue pot filling device comprises a storage container for holding an adhesive granulate, and an adhesive granulate conveying device for pneumatically conveying the adhesive granulate from the storage container into the glue pot of the edge banding machine, wherein the adhesive granulate conveying device comprises:

a conveying line, which has a first end section assigned to the storage container and a second end section assigned to the glue pot;

a compressed air supply device assigned to the first end section for feeding compressed air into the conveying line or a negative pressure supply device assigned to the second end section for feeding a negative pressure into the conveying line; and a filling nozzle arranged at the second end section for discharging the adhesive granulate to the glue pot; and wherein the method comprises the steps of:

conveying the adhesive granulate by compressed air from the storage container through the conveying line to a granulate inlet opening of the filling nozzle;

conveying the adhesive granulate by compressed air through a first section of the filling nozzle along a first direction, which includes a component opposite to the direction of gravity;

conveying the adhesive granulate by gravity through a second section of the filling nozzle, which adjoins the first section to a granule outlet opening of the filling nozzle, in a second direction which is different from the first direction and has a component in the direction of gravity; and conveying at least part of the compressed air from at least one air escape opening, which is arranged in a transition region between the first section and the second section of the filling nozzle in a wall of the filling nozzle, in a third direction, which is different from the second direction.

20. The method according to claim 19, wherein the second direction is directed into the glue pot and the third direction is not directed into the glue pot.

21. The method according to claim 19, further comprising the steps of:

continuous determination of a filling level of the adhesive granulate in the glue pot by means of a filling level monitoring device associated with the glue pot; and automatic activation of the deactivated compressed air supply device or vacuum supply device by a control unit of the edge banding machine if the determined fill level in the glue pot is less than a predetermined minimum fill level assigned to the glue pot.

22. The method of claim 21, further comprising the step of:

automatic deactivation of the activated compressed air supply device or vacuum supply device by the control unit of the edge banding machine if the determined fill level in the glue pot is greater than a predetermined maximum fill level assigned to the glue pot.

23. The method according to claim 19, further comprising the steps of:

determining a filling level of the adhesive granulate in the storage container by a filling level measuring device associated with the storage container; and outputting a warning signal if the determined fill level of the adhesive granulate in the storage container is less than a predetermined minimum fill limit assigned to the storage container.

* * * * *